United States Patent [19]
Homer, III et al.

[11] Patent Number: 5,877,456
[45] Date of Patent: Mar. 2, 1999

[54] SYSTEM FOR CHECKING THE CALIBRATION OF GRAVIMETIC FEEDERS AND BELT SCALES

[75] Inventors: John C. Homer, III, Newbury; J. Ronald Walsh, Hubbard; David P. Ratcliffe, Bristolville, all of Ohio

[73] Assignee: General Signal Corporation, Stamford, Conn.

[21] Appl. No.: 898,211

[22] Filed: Jul. 22, 1997

Related U.S. Application Data

[62] Division of Ser. No. 647,117, May 9, 1996, Pat. No. 5,686,653.

[51] Int. Cl.$^6$ ................................................. G01G 19/52
[52] U.S. Cl. .............................. 177/50; 73/1.13; 177/145
[58] Field of Search ..................... 73/1.13, 1.15; 177/16, 50, 119, 145

[56] References Cited

U.S. PATENT DOCUMENTS

| | | | |
|---|---|---|---|
| 3,396,573 | 8/1968 | Blubaugh | 177/50 |
| 3,675,482 | 7/1972 | Hewitt | 73/144 |
| 3,949,805 | 4/1976 | Hazelett et al. | 198/208 |
| 3,976,150 | 8/1976 | Wilson et al. | 177/16 |
| 3,979,943 | 9/1976 | Foster | 73/1.13 |
| 4,418,773 | 12/1983 | Finet et al. | 177/16 |
| 4,480,705 | 11/1984 | Raske et al. | 177/50 |
| 5,285,019 | 2/1994 | Kempf et al. | 177/16 |

*Primary Examiner*—Randy W. Gibson
*Attorney, Agent, or Firm*—Ohlandt, Greeley, Ruggiero & Perle

[57] ABSTRACT

There is provided an system and method for calibrating weigh assemblies of bulk material feeders using test chains of known weight and pitch. In particular, the present invention is a calibration checking system for a belt-type gravimetric feeder or conveyor having a weigh span section and comprises a continuous conveyor belt, at least one pair of support rollers and at least one weigh roller. A particular weigh roller is disposed under an upper strand of the conveyor belt and equidistant from each of the support rollers so that they are in planar alignment with one another. The calibration checking assembly also comprises a test chain having a chain pitch that is integrally divisible into the pitch of the weigh span section. In addition, portions of the conveyor belt on both sides of the weigh span are inclined equally at a single particular angle relative to the weigh span section. The calibration checking system further comprises a pair of load cells coupled to the ends of the weigh roller and a processor coupled to the loads cells for determining an optimal elevation for the weigh roller. The load cells and processor detect belt tension of the conveyor belt and analyze weigh load in relation to the belt tension.

12 Claims, 5 Drawing Sheets

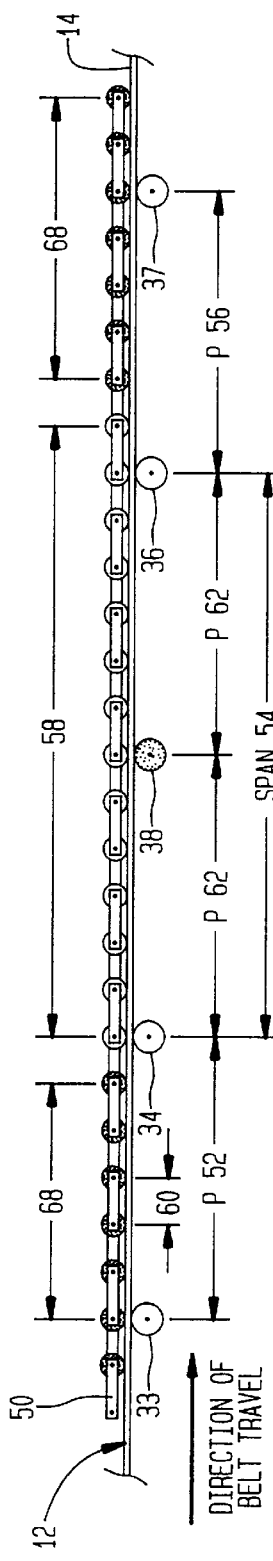
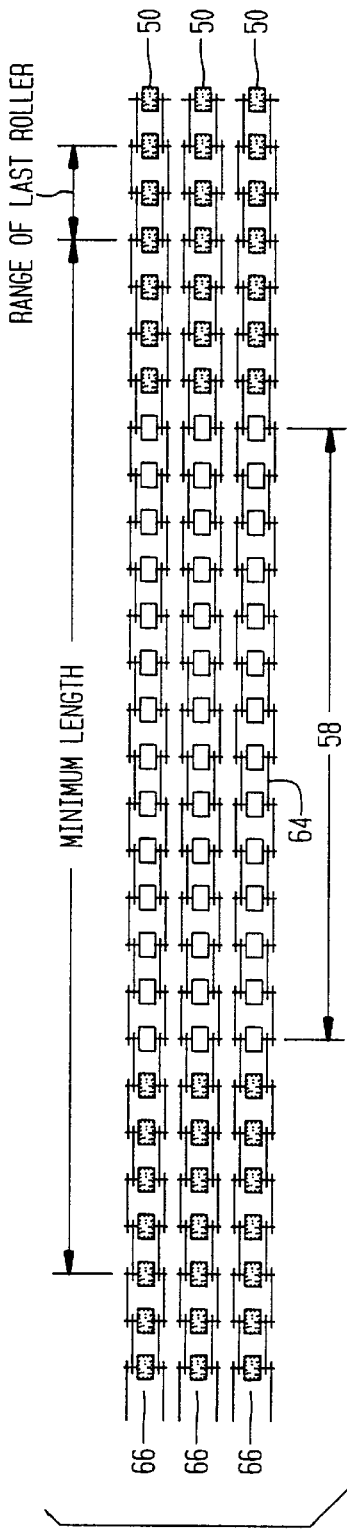
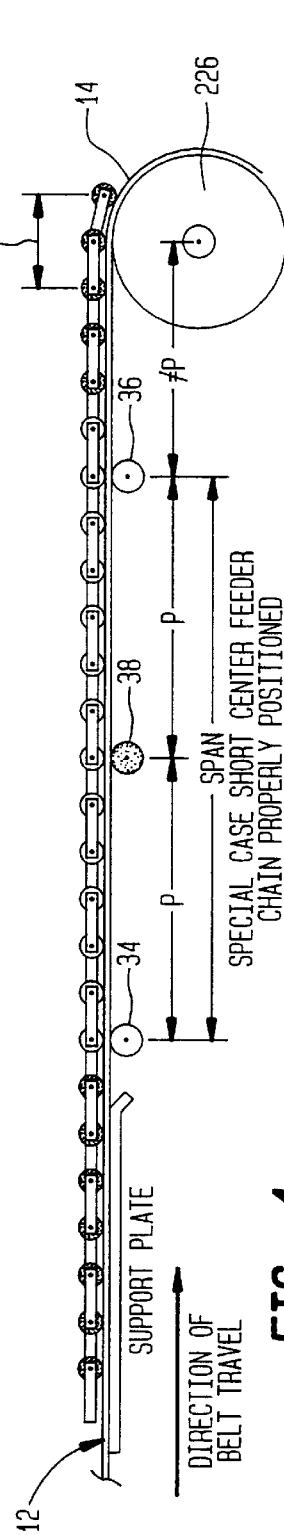

SYSTEM FOR CHECKING THE CALIBRATION OF GRAVIMETIC FEEDERS AND BELT SCALES

This is a division of application Ser. No. 08/647,117, filed May 9, 1996 U.S. Pat. No. 5,686,653.

The present invention relates generally to a system for checking the calibration of the weighing platform of gravimetric belt-type feeders and conveyors used to continuously weigh bulk material as it is transported over the weigh span of the respective feeder. Generally, such gravimetric feeders or conveyors include an inlet section, a discharge section and a weigh span section therebetween. More particularly, the present invention relates to a system for checking the calibration of a particular weighing platform by weighing a precision test chain that is placed across the weigh span of a respective feeder or conveyor and comparing the indicated weight with the known weight of the test chain. The system provides highly reliable results by using a precision test chain of known weight and pitch and establishing certain physical attributes for the weighing platform prior to checking the calibration.

BACKGROUND OF THE INVENTION

Continuous gravimetric feeders or conveyors for transporting bulk material (e.g., crushed coal) from a feed hopper to a receiving bin or metal ore furnace are generally known in the art. Such feeders typically include a conveyor belt that rotates about a pair of oppositely disposed pulleys and a weighing platform for the continuous weighing of bulk material as it passes over a predefined weigh span section. In particular, an upper strand of the belt may be supported by numerous support rollers that are spaced apart a predetermined amount. It is the spacing between any two support rollers having a weigh roller disposed therebetween that defines the length of the weigh span section. As bulk material passes over the weigh span section of a gravimetric feeder, a microprocessor connected to the weigh span section and belt drive (motor) determines the feed rate, i.e., net weight per unit of time, of bulk material carried by the conveyor belt. Thus, by monitoring the feed rate, the speed of the feeder may be controlled to conform with the momentary bulk material delivery requirements. Conveyors equipped with a belt scale may also use microprocessors connected to the weigh platform which integrate the measured weight as bulk material passes over the weigh span. Conveyors of this type are used to transport bulk materials and not to control the rate of delivery.

Typically, the weigh assembly includes a weigh roller for continuously determining the weight of bulk material within the weigh span section of the conveyor. The weigh roller is supported between two support rollers by a piezoelectric type or strain gauge type load cell transducer that produces an electric signal corresponding to the gross weight of bulk material and the tare weight presently disposed within the weigh span section. As bulk material passes over the weigh span section, a microprocessor connected to the assembly receives gross weight information that is the sum of bulk material weight and the tare of the weigh platform and processes this information to calibrate and control the operation of the weigh assembly and gravimetric feeder.

Conventional gravimetric feeders and conveyors have been calibrated using a static reference load. The calibration is conducted by first compensating for tare, then applying a static load consisting of a precisely known weight or weights to an appropriate member of the weigh span section, then calibrating the microprocessor control to display the reference weight. This method of calibration may not always calibrate the weigh span section correctly, and errors can arise due to the reference weight or weights inability to induce a change in belt tension and deflection, such as belt sag, or duplicate structure deflection that otherwise occurs with a material load on the conveyor belt of a gravimetric feeder or conveyor. Also, errors that may arise from bearing friction of the weigh rollers when loaded are ignored during calibration with hanging weight assemblies.

Calibration of gravimetric feeders and conveyors has been verified or certified by material testing. In fact, when questions arise for the above calibration method regarding delivery error, a material test is usually performed to ultimately check its accuracy. Verification is accomplished by passing a quantity of bulk material that the feeder normally conveys, over the weigh span section and comparing the weight of bulk material determined by the test to the reference weight determined either before or after the test on a large precision batch scale. Due to its cost in labor and in down-time of the equipment, a material test is usually used as a last resort. Further, there are serious potential errors that can occur if the test is not carried out with conspicuous attention to detail. These include reduction of material and moisture loss during transport to the scale, materials left in hoppers due to poor flow conditions, and improper consideration of the tare of the transport means.

In addition to material testing, test chains have been used as a reference load to test gravimetric feeders and conveyors. Because test chains provide a reasonable simulation of the loading of the weigh span section, they have been used to indicate when the scale is in need of re-calibration or repair. Initial set-up has usually been accomplished after a material test has been conducted whereby the chains are applied across the weigh span section, noting their position with respect to a fixed reference point on the feeder or conveyor frame and recording the indicated weight. Periodically thereafter, calibration is checked by placing the test chain on the weigh span section, realigning them to the fixed reference position on the feeder or conveyor frame and recording the new weight reading. If the subsequent weight reading of the test chain deviates beyond a particular threshold tolerance, the weigh assembly must be re-calibrated again with another pre-weighed quantity of bulk material.

Test chains are not presently used for direct calibration or as weight reference by conventional systems. It is generally perceived in the industry that test chains produce results that are erratic and sensitive to their placement on the conveyor belt. Because of the perceived, unreliable nature of chain testing due to position sensitivity, test chains have only been used as a reference on weigh span sections for detecting a change in scale performance. As a consequence, the material test calibration described above has been the only method used to identify problems with the weigh span section of a feeder. Thus, in spite of the inconvenience and cost of a material test calibration, such calibration has generally remained in the industry as the preferred method of calibration.

Chain testing may load the weigh span section of a gravimetric feeder in a similar manner as bulk material, but it does simulate the changes in belt tension caused by material loading. In addition, chain testing has significant and demonstrable position instability.

Accordingly, the present invention is a calibration checking system that overcomes the problems associated with the above described conventional systems of material test calibration and reference weights.

The present invention provides a test chain having particular chain pitch that is determined based on the weigh span pitch of its respective conveyor or feeder. Also the gravimetric feeder of the calibration checking system according to the present invention has a particular structural geometry and the weigh assembly has a means for compensating for belt tension to provide a highly accurate and reliable system for checking the calibration of the gravimetric feeder or belt scale. In fact, the calibration checking system of the present invention is capable of obtaining readings that match the known weight of the test chain with an accuracy approaching ±0.1%, whereas conventional calibration checking systems methods ignore the true weight of the chains and compare a currently measured indicted weight to an old recorded indicated weight.

SUMMARY OF THE INVENTION

The present invention is a calibration checking system for a belt-type gravimetric feeder or conveyor equipped with a belt scale having an inlet section, a weigh span section and a discharge section which, in brief summary, comprises a continuous conveyor belt, at least one pair of support rollers and at least one weigh roller disposed therebetween. The conveyor belt has an upper portion and a lower portion moving in opposite directions and is disposed about a pair of pulleys. Each pair of support rollers is positioned under the upper portion and spaced apart to define boundaries of a weigh span section of the conveyor. The weigh span boundaries are further defined as the distance between the center lines of the two support rollers directly adjacent to the weigh roller or weigh roller assembly. The at least one weigh roller is disposed under the upper portion and, where there is more than one weigh roller, the geometric center of the roller set is equidistant from one pair of support rollers. The rollers comprising the weigh span, namely the at least one weigh roller and support rollers, are preferably in parallel and rectangular alignment with one another and perpendicular to a direction of belt travel. The weigh span section of the gravimetric feeder or conveyor with a single weigh roller has a weigh span pitch that is preferably equal to half the distance between the boundaries of the weigh span section. On multiple weigh roller systems, the space between each roller is constant and determines the pitch. The space between outer weigh rollers and adjacent support rollers is also exactly one pitch.

The calibration checking assembly also comprises a distinct chain assembly having a plurality of chain rollers positioned on the upper portion and across the weigh span section of the conveyor belt. The chain has a chain pitch corresponding to the centerline distance between chain rollers that is integrally divisible into the pitch of the weigh span section. The chain has a first end portion, a middle portion and a second end portion that are distributed longitudinally on the inlet section, weigh span section and discharge section, respectively, of the feeder, in which the middle portion has a weight and a pitch that are more carefully controlled than the weight and pitch of each of the first and second end portions. If a chain is used that is not integrally divisible, the chains indicated weight will be a function of its longitudinal position on the weigh plane.

In addition, a symmetric layout of the conveyor belt over the weigh span section rollers is required. Hence, the upper portion of the conveyor belt includes a first belt section disposed between the inlet section and the weigh span section and having a particular angle of approach that approaches a first support roll. The upper portion of the conveyor belt also includes a second belt section disposed between the discharge section and the weigh span section that has a particular angle of retreat that retreats from the second support roll. The single particular angle of the first and second belt sections are maintained equal regardless of any load subjected to the conveyor belt. The angle of approach and the angle of retreat are a function of belt flexibility, belt tension and load.

The calibration checking assembly further includes perturbation analysis means coupled to opposite ends of the at least one weigh roller for determining an optimal elevation for the at least one weigh roller. The perturbation analysis means includes means for analyzing a weigh load extending across the weigh span section in relation to belt tension of the conveyor belt and means for inducing an approximate 10% to 50% step change, preferably about 20%, in the belt tension.

Preferably, the perturbation analysis means includes a pair of load cells coupled to the ends of the at least one weigh roller and a processor coupled to the pair of load cells for determining the magnitude of an elevation error for the at least one weigh roller. On weigh platforms so disposed, the analyzing means of the perturbation analysis means is capable of determining which end of the at least one weight roller requires elevational adjustment and whether the direction of adjustment is up or down. The perturbation analysis means may also be coupled to systems where the weigh platform load is mechanically summed and measured by a single load cell.

BRIEF DESCRIPTION OF THE DRAWINGS

FIG. 3A is a partial side view of the preferred embodiment of FIG. 2A in which a test chain supported on a conveyor belt and a plurality of rollers;

FIG. 3B is a top plan view of the preferred embodiment of FIG. 3A;

FIG. 4 is a partial side view of a conveyor belt of a gravimetric feeder mounted on a pair of support rollers, a weigh roller and a pulley in which a test chain according to the present invention is disposed at its proper position thereon;

DETAILED DESCRIPTION OF THE PREFERRED EMBODIMENT

Figure 1:
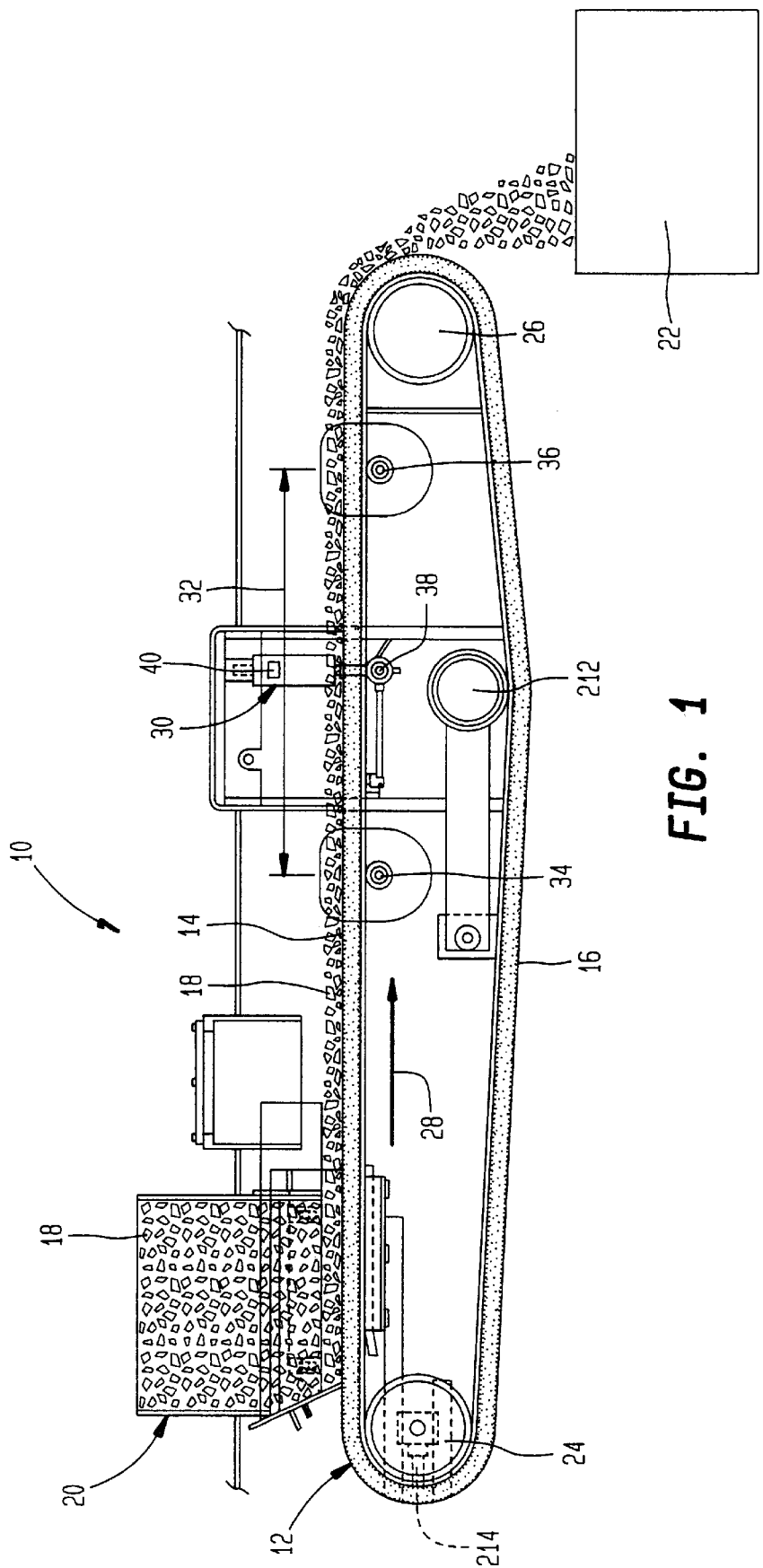
FIG. 1 is a side cross-sectional view of a typical gravimetric feeder with a short centerline-to-centerline, inlet-to-discharge dimension wherein a bulk material is being feed onto a conveyor belt, weighed and discharged from the belt.

The calibration checking system of the present invention is used for a belt-type gravimetric feeder or conveyor assembly having an inlet section, a weigh span section and a discharge section. The system comprises a continuous conveyor belt that is disposed about a pair of pulleys, two or more support rollers positioned under an upper portion of the conveyor belt and a weigh roller disposed under the upper portion and equidistant from each of the support rollers. For the preferred embodiment, the system includes a pair of support rollers and a weigh roller, and the support rollers are level, in planar alignment and are in parallel alignment with one another. The weigh roller is disposed under the upper portion and equidistant from each of the support rollers.

Preferably, the weigh roller and support rollers are in planar alignment with one another. The rollers comprising the weigh span section are preferably in parallel alignment with one another.

In addition, belt supports outside of and on either side of the weigh span section preferably consist of rollers spaced one weigh span pitch away but alternate supports such as a slide pan or drive pulley may be substituted but they must be positioned such that the conveyor belt approach and retreat angles are equal and maintain symmetry across the weigh plane.

The calibration checking system of the present invention is applied to a belt-type feeder or conveyor that is subject to the errors associated with chain testing. The system counters such errors with an appropriately designed test chain and corresponding weigh span section alignment procedure. In regard to the test chain, the pitch of the test chain is preferably integrally divisible into the pitch of the weigh span section of the feeder or conveyor. The weigh span section is preferably divided into two equal spans of the same pitch by the weigh roller, and the strands of the test chain are preferably uniformly distributed laterally across the weigh span section. In the event that the pitch of the chain is not integrally divisible or, to a limited extent, the two weigh span pitches are unequal, the calibration checking system provides for calculation of appropriate chain pitch and position. Also, a middle portion of the chain that rests across the weigh span section is uniform in weight along its length and known to an uncertainty between five to ten times better than the accuracy of the subject weigh scale. Also, this middle portion is adjusted so that it is nearly equivalent to the weight of bulk material that will be weighed when in normal operation. In regard to the feeder or conveyor, the geometry of the weigh span section, including one pitch to either side of the weigh span, is adjusted according to the calibration checking system and, thus, the present invention provides high accuracy by using the preferred test chain and assures insensitivity to belt tension by subjecting the weigh span section to belt tension perturbation analysis and adjustment.

Referring to FIG. 1, in particular, there is provided a typical gravimetric feeder which is generally represented by reference numeral 10. Gravimetric feeder 10 is one particular type of belt conveyor that may use the calibration checking system of the present invention. Gravimetric feeder 10 represents a short centerline-to-centerline, inlet-to-discharge arrangement that is practical for accurate weighing and comprises a continuous or endless conveyor belt 12 in the form of a loop having an upper strand or portion 14 and a lower strand or portion 16 for continuously transporting bulk material 18 (e.g., crushed coal) from a feed hopper 20 to a receiver (e.g., feed bin or furnace) 22. Conveyor belt 12 is disposed about a pair of pulleys (24,26) that drive conveyor belt 12 in a clockwise direction 28, as viewed from the perspective of FIG. 1. Bulk material 18 is preferably evenly distributed onto conveyor belt 12 at one end of upper portion 14 and transported to the other end of upper portion 14 where it falls into receiver 22. As bulk material 18 is transported to the other end of upper portion 14 of conveyor 12, it passes over a weigh plane 32 contained within a weigh span.

Weigh assembly 30 continuously weighs bulk material 18 as it passes over the weigh plane 32 of conveyor belt 12. The boundaries of weigh plane section 32 are defined by the position of two support rollers (34,36) disposed under upper portion 14 of conveyor belt 12. Accordingly, the distance or span separating support rollers (34,36) corresponds to the length of weigh plane section 32. Also, weigh assembly 30 includes a weigh roller 38 of conveyor belt 12. In accordance with the preferred embodiment of the present invention, support rollers (34,36) are disposed on opposite sides of weigh roller 38 in which the pitch between each support roller (34,36) and weigh roller 38 are in the same, or substantially the same, horizontal plane. Since weigh roller 38 is positioned exactly between support rollers (34,36), the distance from weigh roller 38 to either support roller (34,36) corresponds to the pitch of the weigh plane section or one-half the distance between the support rollers.

Weigh assembly 30 includes a precision strain gauge load cell 40 having a static structure, i.e., no moving parts, that is waterproof and barometrically insensitive. Load cell 40 provides a gross weight signal generally in the form of an analog voltage. The gravimetric feeder 10 of the preferred embodiment includes two essentially identical load cells, one disposed about each end of the weigh roller 38, in which both load cells are coupled to a microprocessor for monitoring the weight subjected to weigh roller 38 and control the position of weigh roller 38.

Figure 2A:
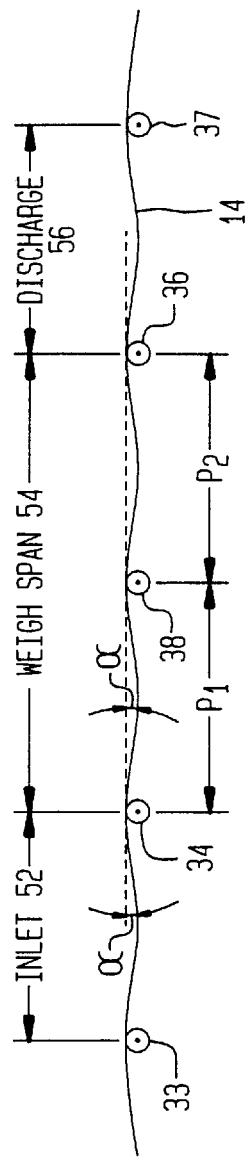
FIG. 2A is a partial side view of a preferred embodiment generally showing the weigh platform.
Figure 2B:
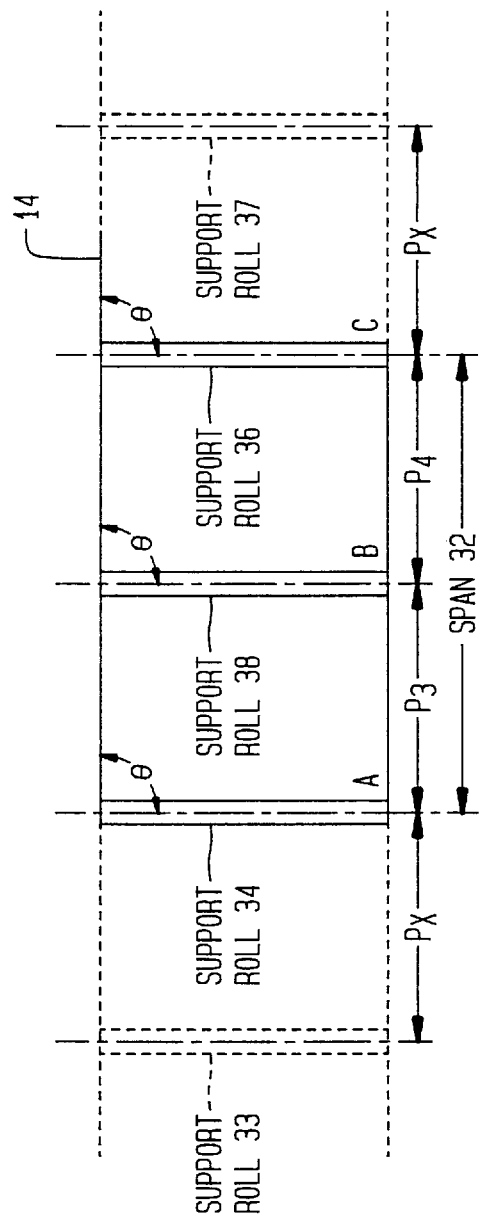
FIG. 2B is a top plan view of the preferred embodiment of FIG. 2A.

FIGS. 2A and 2B are more general representations of the preferred embodiment of FIG. 1. In particular, FIGS. 2A and 2B focus on geometric concerns of the belt conveyor scale used by gravimetric feeder 10 in which span pitches P1, P2, P3 and P4 are all equal. Although not part of weigh plane 32, external support rollers (33,37) are preferably located one weigh span pitch $P_x = P_1$ upstream and downstream, respectively, from weigh plane 32 and are adjusted vertically such that the approach and retreat angles α of belt 14, which sags under load, are equal across weigh plane 32. Support rollers (34,36) and weigh roller 38 are parallel such that all angles θ are equal to one another and form an angle of 90 degrees to the direction of travel of upper portion 14 of conveyor belt 12.

Referring to FIGS. 3A and 3B, the preferred calibration checking assembly comprises a distinct test chain 50 that is distributed longitudinally on upper portion 14 of conveyor belt 12, namely inlet section 52, weigh span section 54, and discharge section 56. As shown in FIG. 3B, test chain 50 may be composed of a plurality of chain strands 66 that are uniformly distributed across weigh plane 54 to accommodate the in-use weight capacity of weigh plane 54. Middle section 58 of test chain 50 extends across weigh span section 54 of the feeder. Pitch 60 of test chain 50 corresponds to the distance between the center of rotation of adjacent chain rollers, and weigh span pitch 62 of weigh span section 54 corresponds to one-half the distance between the boundaries of weigh span 54, i.e. the center of rotation of support rollers 34 and 36. Thus, test chain pitch 60 corresponds to the distance from weigh roller 38 to either support roller (34, 36). In addition, for reasons of economics, the weight and pitch of the sections of test chain 50 that are positioned on inlet section 52 and discharge section 56 are not necessarily as precisely controlled as the middle section 58 of chain 50 that is positioned on weigh platform section 54. The weight accuracy of the chain elements on the weigh platform section 54 is necessarily held to an uncertainty between five and ten times better than the accuracy of the subject weigh scale. Because of the dependence between chain pitch 60 and weigh span pitch 62, any buildup of tolerances of any consecutive set of chain elements contained within one pitch 62 of the weigh span 54 is necessarily held to less than ±0.01%. In addition, chain pitch 60 must be integrally divisible into weigh span pitch 62 of weigh span section 54.

The highly accurate and reliable property of test chain 50 is also due to the precision used to measure middle section 58 of the chain. For the preferred embodiment, the weight of middle section 58 is known to an uncertainty of between five to ten times better than the accuracy of the subject weigh scale. In many cases, gravimetric feeders, such as feeder 10 shown in FIG. 1, deliver bulk material with an accuracy that exceeds ±0.25%. Thus, for preferred test chain 50, the weight of middle section 58 of test chain 50 is known to a precision of no less than ±0.05%. Accordingly, the weight of test chain 50 of the present invention is determined with much higher accuracy than conventional chains whose incremental weight is determined by dividing the chain's gross weight by its length.

Figure 5:
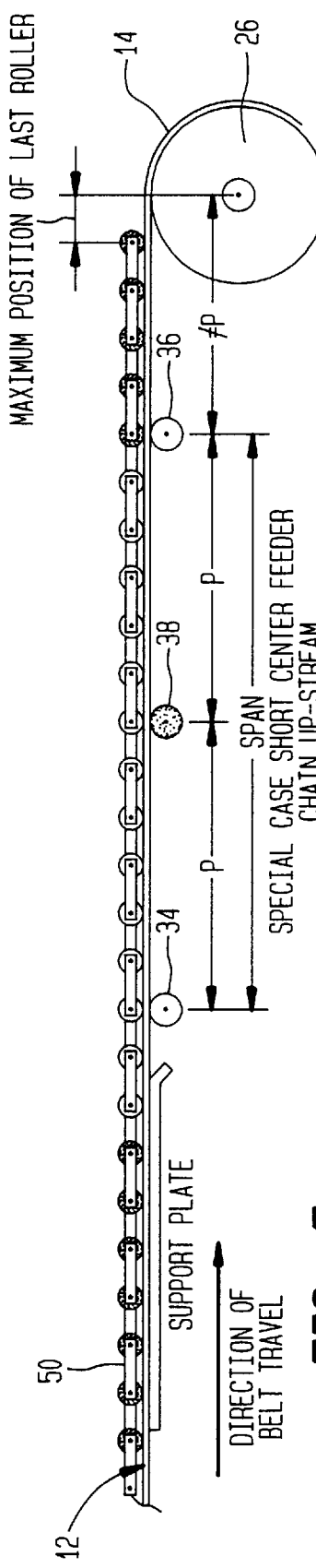
FIG. 5 is a partial side view of the conveyor belt shown in FIG. 4 in which the test chain has been shifted to its maximum upstream position allowable for the preferred embodiment.
Figure 7:
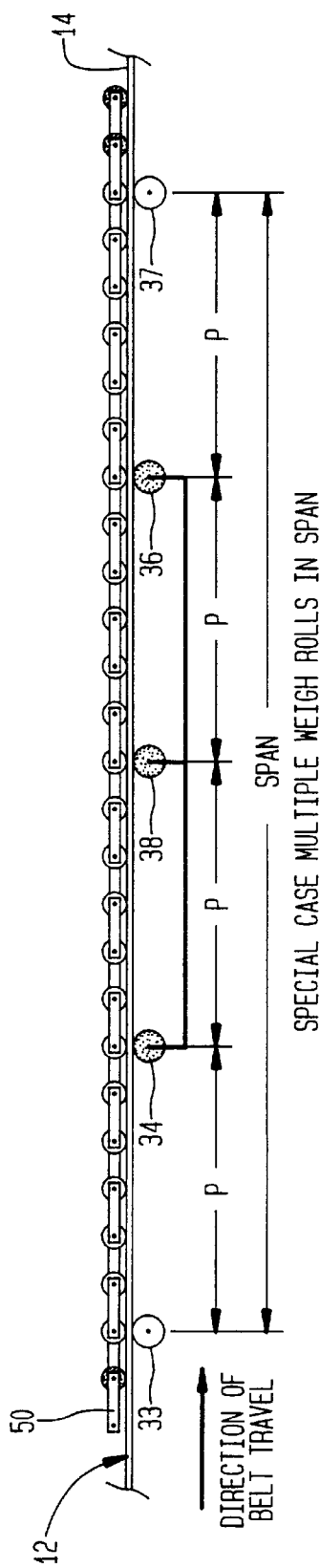
FIG. 7 is a partial side view of the preferred embodiment in which more than one weigh roller is connected to the load cells and placed between two support rolls.

Referring to FIGS. 7 and 5, the position of test chain 50 on upper portion 14 of conveyor belt 12 is also important due to the presence of a support pan and drive pulley used in place of outboard support rollers 33 and 37 (shown in FIG. 3A). The test chain of the preferred embodiment is composed of up to eight strands with 25 rollers per strand. The number of strands permit the approximation of the coal load that the feeder 10 would normally see while the number of rollers in each strand satisfy the width, for example 36 inches, of weigh span section 54.

Other feeder and conveyor designs may require more or less strands and rollers per strand. As described above, the weight of middle section 58 is known to a high degree of precision. In contrast, the weight of outer strands 68 on either side of middle section 58 are not controlled within such a tolerance for reasons of economics. FIG. 4 shows the maximum downstream position of test chain 50 on upper portion 14, and FIG. 5 shows the maximum upstream position of test chain 50 on upper portion 14.

Figure 6:
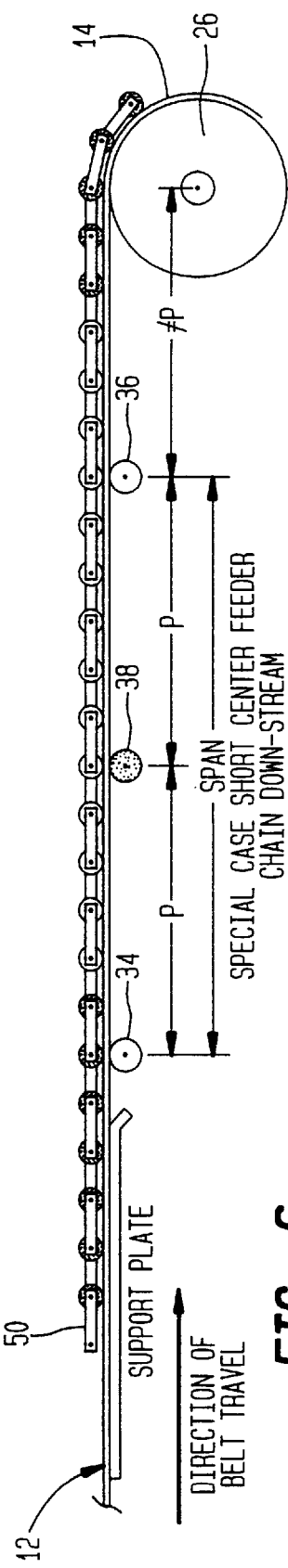
FIG. 6 is a partial side view of the conveyor belt shown in FIG. 4 in which the test chain has been shifted beyond its maximum downstream position shown in FIG. 8 and, thus, illustrates an improperly positioned test chain.

FIG. 6 illustrates several problems that occur for test chains that extend beyond the maximum limits shown in FIGS. 4 and 5. Outer portions 68 of chain 50 are positioned over the weigh span section 54 and, thus, compromise the precision of the calibration checking system. Also, the number of outer rollers that are located upstream from weigh span section 54 may become too few to cover the belt up stream by the equivalent of one weigh platform pitch which will introduce cantilever errors. Cantilever errors are inaccuracies (bias errors) that occur due to influences of loads on conveyor belt 12 on either side of weigh span section 54 by virtue of the stiffness of conveyor belt 12 induce changes in approach and retreat angles α. Further, the downstream portion of test chain 50, that hangs over pulley 26 can tension chain 50 and, thus, effect the loading on weigh span section 54.

Cantilever errors, a direct result of belt stiffness, may be minimized by addressing certain concerns. Test chain 50 should span the gap between downstream support roller 36 and drive pulley 26 shown in FIGS. 4 through 6 or downstream support roller 36 and support pulleys 37 of FIGS. 2A, 2B, 3A and 3B to a tolerance of no greater than ±1 chain pitch. The same concern applies upstream, particularly when upstream support roller 34 is preceded by a support pan instead of support roller 33. When a support pan is used in place of support roller 33, the correct pan elevation is paramount. Thus, to avoid cantilever errors, inlet section 52 and discharge section 56 of upper portion 14 of the conveyor belt 12 must reproduce approach and retreat angles α so as to maintain symmetry over each support roller 34 and 36. The angle α is a function of belt tension flexibility and load magnitude.

Referring to FIG. 7, variations of the preferred embodiment of the present invention are also contemplated. In FIG. 7, more than one weigh roller 38 may be placed between the support rollers and connected to the load cells.

Figure 8:
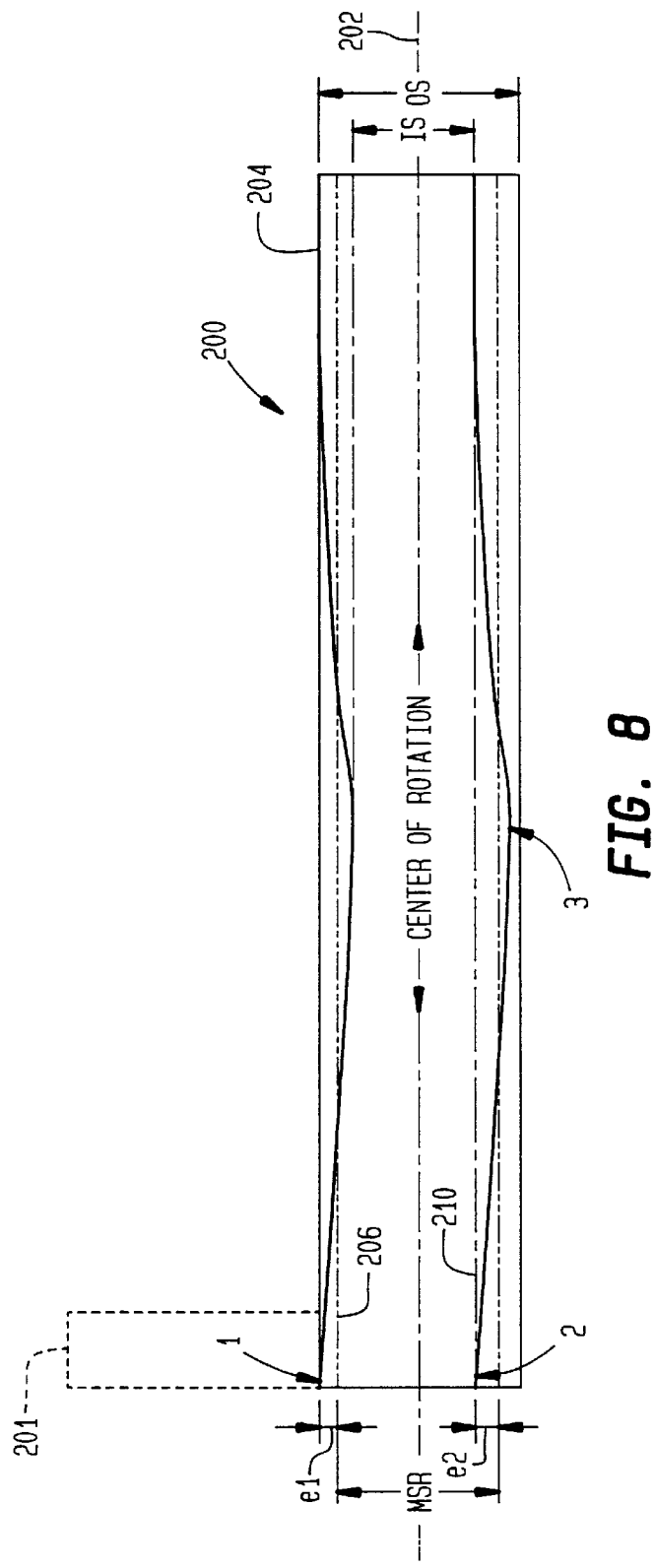
FIG. 8 is a simplified top plan view of roller runout illustrating the relationship between the roller runout and the rollers mean surface of rotation.

Referring to FIG. 8, the calibration checking system of the preferred embodiment further includes perturbation analysis means coupled to opposite ends of the weigh roller for determining an optimal elevation for the weigh roller. The perturbation means provides the solution to the problem of roller runout. The roller illustrated here schematically may be either support rollers 34 and 36 or weigh roller 38. When the roller has runout, it may be impossible to adjust the weigh roller elevation correctly. The problem lies in the fact that the weigh span section responds to the mean surface of revolution of all of the rollers. Hence, the weigh span section developed by support rollers (34,36) may be skewed even though the center of the shafts are at the same elevation.

FIG. 8 shows a roller 200 having a center of rotation 202 and an exaggerated uneven outer surface 204. Mean surface of rotation ("MSR") is shown lying between outer most runout surface 208 and inner-most runout surface 210. When alignment is attempted using a flat bar that is placed across support rollers 34 and 36, roller runout will introduce an error in elevation by the amount that the point of contact between the bar and the roller differs from the MSR. Point 1 in FIG. 8 would place the bar higher than the MSR, while if point 2 were rotated to the top, it would place the bar below the MSR. Since all three rollers in the weigh span section can runout, one can see that there is a high probability that the MSR of weigh roller 38 will not lie in the plane established by the MSR of support rollers 34 and 36. Further, the mean runout of each roller is difficult to measure because the installed rollers are difficult to access and usually only the outer edge of the rollers are available for measurement. Also, the roller may not exhibit runout in the area of measurement, typically in the radial area of point 1, while runout may occur elsewhere such as at point 3. The problem faced by anyone setting up a weigh span section, then, is to bring about a lateral alignment of all three rollers' MSR to within a tolerance of ±0.001%. This is accomplished using the method of perturbation taught by the present invention.

The perturbation means is comprised of a means for inducing a step change in belt tension of conveyor belt 12, a means for detecting and analyzing the response of a loaded weigh span section to the step change, and a means for adjusting the weigh roller elevation to within the given tolerance. For the preferred embodiment, the perturbation means includes any of several methods for inducing at least a 10% change in belt tension. This may take the form of weights added to tension pulley 212 shown in FIG. 1 or simply changing the longitudinal position of the feeder or conveyor tail pulley 24 by way of belt tension take-up adjustors 214 also shown in FIG. 1. The detecting means of the preferred embodiment includes first and second load cells 40 coupled to the ends of the weigh roller and a processor coupled to the first and second load cells for determining an elevation adjustment for the weigh roller which may be accomplished using a fine pitch adjustment means. Also, the means for analyzing the result of applying the perturbations means is capable of determining which end of the weigh roller requires elevational adjustment and whether the adjustment must increase or decrease that end of the weigh roller.

When weigh roller 38 is pulled out of the weigh plane established by the MSR of support rollers 34 and 36 by the coal or chain load, weigh span section 54 becomes sensitive to belt tension. Generally, the weight of bulk material uniformly distributed on weigh span section 54 causes a deflection D of weigh roller 38 and gives rise to a restoring reaction R that is the resultant of belt tension T. Assuming that belt 12 does not sag between the rollers, the following analysis is a simplification but is sufficient to show the source of error due to belt tension. First, for small deflections ($\theta \leq 10°$), tan $\theta$ is about equal to sin$\theta$ where $\theta$ is the angle formed by deflection D and P being the distance between the un-deflected roller and the support roller. Due to this geometric relationship, D/P is the tangent of $\theta$, and because the deflection is small, $\theta$ is about equal to D/P. But R is the side opposite $\theta$ and, hence, R=T sin $\theta$ or R=TD/P or actually R=2TD/P because there are two pitch sections in the weigh plane. Reaction R is measured by load cell 40 as a bias error that takes the form:

$$\epsilon = -\frac{R}{W} = \frac{2*T*D}{\overline{\omega}*P^2}$$

where $\epsilon$ is the error ratio created by R, the resultant of D and T;

P is the weigh span pitch;

W is the weight on half of the weigh span section;

$\omega$ is the weight gradient on the weigh span section;

D is the displacement due to the deflection of the load cell under load; and

R again is the reaction due to D and is negative because it reduces W.

It is important to note that reaction R is proportional to belt tension and inversely proportional to the square of the weigh span pitch. Hence, deflection D of load cell 40 gives rise to an error that varies with the magnitude of the change of belt tension, hence, it is an error of repeatability or precision that is not easily calibrated out of a gravimetric feeder or conveyor weigh span section.

Since variations in belt tension are unavoidable and typically cause repeatability errors, such sensitivity must be minimized. This can be accomplished by selecting a calibration weight that is equivalent to the coal weight-on-the-span for each individual installation. The value of the calibration weight should be selected to be equivalent to the user's mean coal density. Thus the span and coal outlet cross-section must be known or derived. The correct calibration weight is calculated a follows:

Cal. Weight=mean coal density×½(span×cross-section)

In the case where two calibration weights are used, each weight is equivalent to one half of the weight calculated.

Perturbation, then, is accomplished with the installed calibration weights, calculated above. By adjusting weigh roller 38 elevation using the output of the sensing and analytical means mentioned above, the weigh roller will be positioned such that it has a minimum sensitivity to belt tension variations when carrying the coal load.

The calibration checking system of the present invention provides a perturbation means and method to effectively set weigh roller 38 into a plane established by the MSR of support rollers (34,36). For the preferred embodiment, the perturbation means includes the pair of load cells 40 coupled to the ends of weigh roller 38 and a processor coupled to load cells 40 for a predetermined elevation for weigh roller 38. In particular, the processor is programmed to display, on demand, the load of each load cell 40 averaged independently over one integral revolution of the conveyor belt 12. Initially, weigh span 54 is loaded with either the calibration weights or test chain 50. Feeder 10 is then operated for at least one integral revolution of conveyor belt 12 and the resulting mean weight is recorded. Second, the belt tension is increased by at least 10% to 50% (nominally 200 to 300 pounds). This may be accomplished in a number of ways including adjusting the belt take-ups 214 or adding an additional load at tensioning pulley 212. The first procedure is then repeated. If the resulting load output of either load cell 40 increases for an increase in belt tension, then the end of the weigh roller 38 that corresponds to that load cell is set too high, and the converse is also true. The preferred embodiment has the ability to set the elevation of weigh roller 38 to within 0.0005 inches of it's correct position by using this perturbation means and method.

The invention having been thus described with particular reference to the preferred forms thereof, it will be obvious that various changes and modifications may be made therein without departing from the spirit and scope of the invention as defined in the appended claims.

What is claimed is:

1. A method for checking the calibration of a belt feeder or conveyor having a continuous conveyor belt disposed about a pair of pulleys, the feeder or conveyor having a inlet section, a weigh span section and a discharge section in which the weigh span section has a weigh span pitch, the method comprising the steps of:

selecting a distinct chain having a plurality of chain rollers, the distinct chain having a chain pitch corresponding to the distance between adjacent chain rollers that is integrally divisible into the weigh span pitch of the conveyor belt;

positioning the distinct chain on the inlet section, the weigh span section and the discharge section of the conveyor belt so that the distinct chain is positioned across the weigh span section; and checking the calibration of said belt feeder or conveyor by using the distinct chain to simulate a material load.

2. The method of claim 1 wherein said conveyor belt has a first belt section disposed between the inlet section and said weigh span section and a second belt section disposed between said discharge section and said weigh span section and further comprising the step of:

maintaining an angle of approach of the first belt section and an angle of retreat of the second belt section equal regardless of load subjected to the conveyor belt before the step of positioning the distinct chain.

3. The method of claim 2, wherein the angle of approach and the angle of retreat are a function of belt flexibility, belt tension and load.

4. The method of claim 1 wherein said belt feeder or conveyor comprises at least one pair of support rollers and at least one weigh roller disposed under said weigh span section and further comprising the step of:

determining an optimal elevation for said at least one weigh roller, said determining step includes analyzing a weigh load extending across the weigh span section in relation to belt tension of the conveyor belt and adjusting the elevation in response to analyzing the weigh load before the step of checking the calibration.

5. The method of claim 4, wherein the step of adjusting the belt tension includes adjusting the belt tension between two predetermined belt tensions.

6. The method of claim 4, wherein the step of analyzing the weigh load includes determining a magnitude of an elevation error for the at least one weigh roller.

7. The method of claim 4, wherein the step of analyzing the weigh load includes summing a mechanical load of the weigh span section for at least one complete belt revolution.

8. The method of claim 4, wherein the step of analyzing the weigh load includes determining which end of the at least one weigh roller requires elevational adjustment.

9. The method of claim 8, wherein the step of analyzing the weigh load includes calibrating the belt feeder or conveyor after the step of determining which end of the at least one weigh roller requires elevational adjustment.

10. The method of claim 1 wherein said distinct chain has a first end portion, a middle portion and a second end portion that are distributed on the inlet section, said weigh span section and said discharge section, respectively, of said feeder wherein said middle portion has a particular weight and pitch and further comprising the step of:

controlling the particular weight and pitch more carefully than a weight and a pitch of each of the first and second end portions before the step of checking the calibration.

11. The method of claim 1, wherein said step of checking the calibration includes comparing a chain weight of the distinct chain for at least one belt revolution to a precisely known weight of the distinct chain.

12. The method of claim 2 wherein said feeder or conveyor includes an upstream support roller and a downstream support roller disposed under said first and second belt sections, respectively; and wherein said angles of approach and retreat are maintained equal by vertically adjusting said upstream and downstream rollers.

* * * * *